United States Patent
Greenhalgh et al.

(10) Patent No.: US 8,635,406 B2
(45) Date of Patent: Jan. 21, 2014

(54) DATA PROCESSING APPARATUS AND METHOD FOR PROVIDING TARGET ADDRESS INFORMATION FOR BRANCH INSTRUCTIONS

(75) Inventors: Peter R Greenhalgh, Cambridge (GB); Simon J Craske, Cambridge (GB)

(73) Assignee: ARM Limited, Cambridge (GB)

( * ) Notice: Subject to any disclaimer, the term of this patent is extended or adjusted under 35 U.S.C. 154(b) by 134 days.

(21) Appl. No.: 13/415,031

(22) Filed: Mar. 8, 2012

(65) Prior Publication Data
US 2013/0238858 A1    Sep. 12, 2013

(51) Int. Cl.
    G06F 12/14    (2006.01)

(52) U.S. Cl.
    USPC ........... 711/133; 711/137; 711/203; 711/213; 710/3

(58) Field of Classification Search
    USPC ............ 711/133, 137, 203, 213; 710/3
    See application file for complete search history.

(56) References Cited

U.S. PATENT DOCUMENTS

| | | | |
|---|---|---|---|
| 5,163,140 A | | 11/1992 | Stiles et al. |
| 5,261,066 A | * | 11/1993 | Jouppi et al. ................. 711/122 |
| 5,454,087 A | * | 9/1995 | Narita et al. ................. 712/240 |
| 6,055,650 A | * | 4/2000 | Christie ........................ 714/39 |
| 7,783,870 B2 | | 8/2010 | Levitan et al. |
| 2004/0015683 A1 | * | 1/2004 | Emma et al. ................. 712/240 |
| 2009/0006871 A1 | * | 1/2009 | Liu et al. ...................... 713/300 |
| 2009/0019229 A1 | * | 1/2009 | Morrow et al. .............. 711/137 |
| 2012/0096227 A1 | * | 4/2012 | Dubrovin et al. ............ 711/137 |

* cited by examiner

*Primary Examiner* — Jae Yu
(74) *Attorney, Agent, or Firm* — Nixon & Vanderhye P.C.

(57) ABSTRACT

A data processing apparatus and method have a processor for executing instructions, and a prefetch unit for prefetching instructions from memory prior to sending those instructions to the processor for execution. A branch target cache structure has a plurality of entries, where the cache structure comprises an initial branch target cache having a first number of entries and a promoted entry branch target cache having a second number of entries. During lookup operation, both the initial entry branch target cache and the promoted entry branch target cache are accessed in parallel. For a branch instruction executed by the processor that does not currently have a corresponding entry in the branch target cache structure, allocation circuitry performs an initial allocation operation to allocate one of the entries in the initial entry branch target cache for storing the branch instruction information for that branch instruction.

17 Claims, 7 Drawing Sheets

DATA PROCESSING APPARATUS AND METHOD FOR PROVIDING TARGET ADDRESS INFORMATION FOR BRANCH INSTRUCTIONS

BACKGROUND OF THE INVENTION

1. Field of the Invention

The present invention relates to a data processing apparatus and method for providing target address information for branch instructions.

2. Description of the Prior Art

A data processing apparatus will typically include a processor core for executing instructions. Typically, a prefetch unit will be provided for prefetching instructions from memory that are required by the processor core, with the aim of ensuring that the processor core has a steady stream of instructions to execute, thereby aiming to maximise the performance of the processor core.

To assist the prefetch unit in its task of retrieving instructions for the processor core, prediction circuitry is often provided for predicting which instruction should be prefetched by the prefetch unit. The prediction circuitry is useful since instruction sequences are often not stored in memory one after another, and software execution often involves changes in instruction flow that cause the processor core to move between different sections of code depending on the task being executed.

When executing software, a change in instruction flow typically occurs as a result of a "branch", which results in the instruction flow jumping to a particular section of code as specified by a target address for the branch. The branch can optionally specify a return address to be used after the section of code executed by the branch has executed.

Accordingly, the prediction circuitry can take the form of a branch prediction unit which is provided to predict whether a branch will be taken. If the branch prediction unit predicts that a branch will be taken, then it instructs the prefetch unit to retrieve the instruction that is specified by the target address of the branch, and clearly if the branch prediction is accurate, this will serve to increase the performance of the processor core since it will not subsequently need to stop its execution flow whilst that instruction is retrieved from memory. Typically, a record will be kept of the address of the instruction that would be required if the prediction made by the branch prediction circuitry was wrong, such that if the processor core subsequently determines that the prediction was wrong, the prefetch unit can then retrieve the required instruction.

Often, such branches in instruction flow occur as a result of executing branch instructions. Branch instructions are often conditional, such that if they are executed the instruction flow will jump to an instruction specified by a target address of the branch instruction, whereas if they are not executed the next instruction will typically be the immediately following instruction in the address space.

There are various known mechanisms by which the branch prediction unit can predict whether a branch instruction will be executed or not, and accordingly whether the branch will be taken or not. Whenever it is predicted that the branch will be taken, it is also necessary to calculate the target address from which the next instruction should be fetched. For direct branch instructions, an immediate value (for example specifying an offset) is directly specified within the branch instruction, and the target address can be directly calculated using this immediate value and the address of the currently prefetched instruction. However, for indirect branch instructions, no immediate value is directly specified, and instead a working register of the processor core will typically be specified from where information used to determine the target address can be received. As a result, this information is not available to the prefetch unit at the time the prediction of the target address is required.

Accordingly, it is known to provide a branch target cache structure within the prefetch unit having a plurality of entries, where each entry can store branch instruction information for a branch instruction that has been executed by the processor, with that branch instruction information including an address identifier for the branch instruction and target address information.

Accordingly, for a currently prefetched instruction, the prefetch unit can initiate a lookup operation within the branch target cache structure in order to see if the address of the currently prefetched instruction matches an address identifier in one of the entries of the branch target cache structure. If so, a hit will be detected, and the associated target address information will be returned. Assuming this currently prefetched instruction is an indirect branch instruction that is predicted as taken by the prediction circuitry, the returned target address information will then be used in order to determine the target address.

If a hit is not detected within the branch target cache structure then it is typically not possible to predict the target address for an indirect branch instruction, and hence the prefetch unit is not able to prefetch the instruction that will be required if the indirect branch instruction does in fact result in the branch being taken when that instruction is executed by the processor. In this scenario, it is clear that the performance of the processor is thereby impacted, since only once that indirect branch instruction has been executed by the processor, and the actual target address has been determined, can the prefetch unit then prefetch the required instruction.

Accordingly, one way to improve the processor performance is to increase the size of the branch target cache structure, so that more information is retained within the branch target cache structure, and accordingly the probability of a hit being detected is increased. However, such larger branch target cache structures clearly have an adverse impact on area and power consumption. In addition, as the sizes increase there will become a point where it will take multiple clock cycles to complete the lookup operation in order to determine whether a hit condition is present.

There is currently a desire to produce area and power efficient processors, where it is not practical to provide large branch target cache structures. Accordingly, a problem that arises is how to make the best use of the relatively small number of branch target cache entries that can be provided within such area and power efficient processors. In particular, with only a relatively small number of entries, it will be appreciated that the information in those entries is more likely to be evicted due to the need to allocate into the branch target cache structure branch target information relating to branch instructions executed by the processor but not currently having a corresponding entry in the branch target cache structure. This can be particularly problematic when using standard replacement mechanisms such as round-robin or pseudorandom replacement mechanisms in order to decide which entry to allocate new branch target information to, since no distinction is made between entries containing useful branch target information and entries whose stored branch target information has been less useful.

One approach that could be taken to seek to retain within the branch target cache branch target information that has proven to be more useful than others would be to maintain a "weighting" value against each of the entries so that entries whose contents have been proven to be more useful than others will be less likely to have their contents replaced. However, this requires introducing complexity into the replacement mechanism which can create performance issues due to the time then taken to process the cache and the weighting values before deciding which entry to allocate the new branch instruction information to.

Another approach that can be taken is to provide a two-level branch target cache arrangement where the first level branch target cache is kept small, but data evicted from that first level branch target cache to free up space for newly allocated branch instruction information is demoted to the second level branch target cache. Typically, the second level branch target cache will be slower to access than the first level branch target cache, and often the structure of the two caches, and the information maintained in their entries, is different. Examples of known two-level branch target cache arrangements are discussed in U.S. Pat. No. 5,163,140 and U.S. Pat. No. 7,783,870.

Accordingly, it would be desirable to provide an improved mechanism for providing target address information for branch instructions which alleviates the area, power and/or timing issues associated with known prior art techniques, whilst improving the retention of branch instruction information that has proven to be useful.

SUMMARY OF THE INVENTION

Viewed from a first aspect, the present invention provides a data processing apparatus, comprising: a processor configured to execute instructions including branch instructions; a prefetch unit configured to prefetch instructions from memory prior to sending those instructions to the processor for execution; a branch target cache structure having a plurality of entries, each entry configured to store branch instruction information, said branch instruction information comprising an address identifier for a branch instruction executed by said processor and at least target address information associated with that branch instruction; said prefetch unit being configured, using an address of a currently prefetched instruction, to initiate a lookup operation within said branch target cache structure in order to determine if a hit condition is present, said hit condition being present if the address identifier stored in one of said plurality of entries matches with the address of the currently prefetched instruction, and in the presence of said hit condition the prefetch unit being configured to receive said at least target address information from the entry giving rise to the hit condition; said branch target cache structure comprising an initial entry branch target cache having a first number of entries, and a promoted entry branch target cache having a second number of entries, said first number of entries and said second number of entries collectively forming said plurality of entries of the branch target cache structure; the branch target cache structure being configured such that said initial entry branch target cache and said promoted entry branch target cache are accessed in parallel during said lookup operation; the data processing apparatus further comprising allocation circuitry configured, for a branch instruction executed by the processor that does not currently have a corresponding entry in the branch target cache structure, to perform an initial allocation operation to allocate one of the entries in the initial entry branch target cache for storing the branch instruction information for that branch instruction; and the allocation circuitry further being responsive to detection of a promotion threshold condition in relation to one of the entries in said initial entry branch target cache, to perform a promotion allocation operation to migrate the branch instruction information from that entry of the initial entry branch target cache to an allocated entry of the promoted entry branch target cache.

In accordance with the present invention, the branch target cache structure comprises both an initial entry branch target cache and a promoted entry branch target cache that are accessed in parallel during the lookup operation. Further, whenever there is a need to allocate an entry to store branch instruction information for a branch instruction executed by the processor that does not currently have a corresponding entry in the branch target cache structure, the allocation circuitry performs an initial allocation operation which will always allocate that branch instruction information to one of the entries in the initial entry branch target cache. In addition, on detection of a promotion threshold condition in relation to one of the entries in the initial entry branch target cache, the allocation circuitry performs a promotion allocation operation to migrate the branch instruction information from that entry into one of the entries of the promoted entry branch target cache.

The promotion threshold condition can be set in a variety of ways, but it is intended to identify entries whose contents have met some usefulness criteria in assessing instructions to be prefetched by the prefetch unit. As a result, it will be seen that such useful branch instruction information will tend to be migrated to the promoted entry branch target cache. In combination with the fact that all new allocations into the branch target cache structure occur in respect of the initial entry branch target cache, it will be seen that such an approach biases the branch target cache structure towards retention of the useful branch instruction information. Further, since any new allocation occurs in respect of the entries of the initial entry branch target cache, there is no need to complicate the replacement scheme, and in one embodiment a simple replacement mechanism such as a round-robin or a pseudo-random mechanism can be used to identify the entry in the initial entry branch target cache to be allocated for the storing of the new branch instruction information.

Furthermore, since the initial entry branch target cache and the promoted entry branch target cache are both accessed in parallel during the lookup operation, the use of the technique of the present invention does not give rise to any adverse timing issues, when compared with an equivalent sized prior art branch target cache. For example, if the total number of entries provided by the entries of the initial entry branch target cache and the promoted entry branch target cache is 8 (for example due to there being 4 entries in each of the initial entry branch target cache and the promoted entry branch target cache), then by performing the lookup operation in parallel, the results of the lookup operation will be available just as quickly (and often slightly earlier) than would be the case had a single 8-entry branch target cache of a prior art arrangement been used.

Accordingly, it can be seen that the present invention allows a branch target cache structure having a relatively small number of entries to be constructed, thereby meeting the area and power consumption requirements of modern area and power efficient processors to be met, whilst improving retention of branch instruction information which has proven to be useful, and without increasing the time taken to perform lookup and allocation operations in respect of the branch target cache structure.

In one embodiment, the initial entry branch target cache and the promoted entry branch target cache are configured such that results of the lookup operation are available from both the initial entry branch target cache and the promoted entry branch target cache during the same clock cycle. There are various ways in which this can be achieved. For example, in one embodiment each entry in the initial entry branch target cache has the same structure as each entry in the promoted entry branch target cache. Accordingly, in such embodiments, the format of the data held in each entry is identical and it is therefore easy to migrate information from one cache to the other, and in addition the time taken to perform a lookup or an allocation operation in respect of an entry is the same.

Alternatively, or in addition, the initial entry branch target cache can be arranged to have the same number of entries as the promoted entry branch target cache, thereby also assisting in ensuring that the time taken for the lookup operation to be performed in both branch target caches is the same.

There are number of ways in which the entry in the initial entry branch target cache whose branch instruction information has been migrated to the promoted entry branch target cache can be handled. In one embodiment, the allocation circuitry is configured during the promotion allocation operation to invalidate the entry in the initial entry branch target cache whose branch instruction information has been migrated to the promoted entry branch target cache. Since the entry has been invalidated, it is then likely to be selected next time an allocation into the initial entry branch target cache is required.

However, in an alternative embodiment the allocation circuitry is configured during the promotion allocation operation to additionally migrate the branch instruction information previously stored in the allocated entry of the promoted entry branch target cache to the entry in the initial entry branch target cache whose branch instruction information has been migrated to the promoted entry branch target cache. Such an approach has a benefit that the branch instruction information that is evicted from the promoted entry branch target cache is still retained within the overall branch target cache structure. Since the branch instruction information stored within the entries of the promoted entry branch target cache will have at some point in the past met the promotion threshold condition, it is likely that that information may still be of use, and hence demoting it back to the initial entry branch target cache rather than discarding it may further improve the hit rate within the branch target cache structure.

The manner in which the lookup operation is performed can take a variety of forms. However in one embodiment the data processing apparatus further comprises first lookup circuitry provided in association with the initial entry branch target cache and second lookup circuitry provided in association with the promoted entry branch target cache, the first lookup circuitry and the second lookup circuitry being configured to operate in parallel during said lookup operation. Hence, in such embodiments, both the initial entry branch target cache and the promoted entry branch target cache have their own dedicated lookup circuitry.

The allocation circuitry can also take a variety of forms. In one embodiment, the allocation circuitry comprises first allocation circuitry provided in association with the initial entry branch target cache; second allocation circuitry provided in association with the promoted entry branch target cache; and allocation control circuitry for controlling the operation of the first and second allocation circuitry to perform said initial allocation operation and said promotion allocation operation. This provides a particularly simple and effective arrangement for allowing the allocation circuitry to perform both the initial allocation operations and promotion allocation operations required in accordance with embodiments of the present invention.

There are a number of ways in which the promotion threshold condition can be detected. In one embodiment, the allocation circuitry is configured to detect the promotion threshold condition in relation to one of the entries in said initial entry branch target cache if the hit condition is detected for that entry. Hence, in this embodiment, as soon as the contents of a particular entry have given rise to a hit condition, the promotion threshold condition is determined to have occurred in respect of that entry.

In an alternative embodiment, rather than the promotion threshold condition being detected as soon as a single hit condition has arisen in respect of the contents of a particular entry, the promotion threshold condition may only be determined to have occurred if the contents of a particular entry give rise to multiple hit conditions. In particular, in one embodiment, the data processing apparatus further comprises counter circuitry configured to store a count value associated with each entry of the initial entry branch target cache, the count value being arranged to be incremented each time the hit condition is detected for the associated entry. The allocation circuitry is then configured to monitor the counter circuitry and to detect the promotion threshold condition in relation to one of the entries in said initial entry branch target cache if the associated count value reaches a threshold value. It will be appreciated that the threshold value may be set as desired, dependent on the implementation.

In one embodiment, the data processing apparatus further comprises branch prediction circuitry configured to receive results of the lookup operation performed in the branch target cache structure, and in the event that the currently prefetched instruction specifies an indirect branch and said hit condition was detected, to predict if the branch will be taken or not taken when that currently prefetched instruction is subsequently executed by the processor. If the prediction circuitry predicts that the branch will be taken, the prediction circuitry is further configured to use said at least target address information from the branch target cache structure to determine the next instruction to be prefetched by the prefetch unit.

In one such embodiment, whilst the promotion threshold condition described earlier may be used to identify to the allocation circuitry that the promotion allocation process should be performed, the allocation circuitry does not immediately perform the promotion allocation process, but instead awaits the outcome of the actual execution of the instruction within the processor before performing the promotion allocation process. In particular, in one embodiment, the allocation circuitry is arranged to receive a promotion qualifier signal from the processor when that currently prefetched instruction is subsequently executed by the processor, the promotion qualifier signal identifying if the target address information was correct, and the allocation circuitry is configured to defer performing the promotion allocation operation until the promotion qualifier signal is received, and only to then perform the promotion allocation operation if the promotion qualifier signal identifies that the target address information was correct.

The initial entry branch target cache and the promoted entry branch target cache can take a variety of forms. In one embodiment, both the initial entry branch target cache and the promoted entry branch target cache are formed as a branch target address cache (BTAC). Hence, each entry stores an address identifier for a branch instruction and target address information for that branch instruction.

In an alternative embodiment, both the initial entry branch target cache and the promoted entry branch target cache are formed as a branch target instruction cache (BTIC), such that each entry additionally includes at least one instruction for providing to the processor, and the target address information identifies a next instruction to be prefetched after said at least one instruction.

Viewed from a second aspect, the present invention provides a branch target cache structure for use in a data processing apparatus that has a processor for executing instructions including branch instructions and a prefetch unit for prefetching instructions from memory prior to sending those instructions to the processor for execution, said branch target cache structure comprising: a plurality of entries, each entry configured to store branch instruction information, said branch instruction information comprising an address identifier for a branch instruction executed by said processor and at least target address information associated with that branch instruction; lookup circuitry, responsive to an address of a currently prefetched instruction, to initiate a lookup operation within said plurality of entries in order to determine if a hit condition is present, said hit condition being present if the address identifier stored in one of said plurality of entries matches with the address of the currently prefetched instruction, and in the presence of said hit condition the lookup circuitry being configured to output to the prefetch unit said at least target address information from the entry giving rise to the hit condition; an initial entry branch target cache having a first number of entries, and a promoted entry branch target cache having a second number of entries, said first number of entries and said second number of entries collectively forming said plurality of entries of the branch target cache structure; the lookup circuitry being configured such that said initial entry branch target cache and said promoted entry branch target cache are accessed in parallel during said lookup operation; allocation circuitry configured, for a branch instruction executed by the processor that does not currently have a corresponding entry in the branch target cache structure, to perform an initial allocation operation to allocate one of the entries in the initial entry branch target cache for storing the branch instruction information for that branch instruction; and the allocation circuitry further being responsive to detection of a promotion threshold condition in relation to one of the entries in said initial entry branch target cache, to perform a promotion allocation operation to migrate the branch instruction information from that entry of the initial entry branch target cache to an allocated entry of the promoted entry branch target cache.

Viewed from a third aspect the present invention provides a method of providing target address information for branch instructions within a data processing apparatus having a processor for executing instructions including said branch instructions, and a prefetch unit for prefetching instructions from memory prior to sending those instructions to the processor for execution, the method comprising: providing a branch target cache structure having a plurality of entries, each entry storing branch instruction information, said branch instruction information comprising an address identifier for a branch instruction executed by said processor and at least target address information associated with that branch instruction; responsive to an address of a currently prefetched instruction, performing a lookup operation within said branch target cache structure in order to determine if a hit condition is present, said hit condition being present if the address identifier stored in one of said plurality of entries matches with the address of the currently prefetched instruction, and in the presence of said hit condition outputting said at least target address information from the entry giving rise to the hit condition; providing an initial entry branch target cache having a first number of entries, and a promoted entry branch target cache having a second number of entries, said first number of entries and said second number of entries collectively forming said plurality of entries of the branch target cache structure; configuring the branch target cache structure such that said initial entry branch target cache and said promoted entry branch target cache are accessed in parallel during said lookup operation; for a branch instruction executed by the processor that does not currently have a corresponding entry in the branch target cache structure, performing an initial allocation operation to allocate one of the entries in the initial entry branch target cache for storing the branch instruction information for that branch instruction; and responsive to detection of a promotion threshold condition in relation to one of the entries in said initial entry branch target cache, performing a promotion allocation operation to migrate the branch instruction information from that entry of the initial entry branch target cache to an allocated entry of the promoted entry branch target cache.

Viewed from a fourth aspect the present invention provides a data processing apparatus, comprising: processing means for executing instructions including branch instructions; prefetch means for prefetching instructions from memory prior to sending those instructions to the processing means for execution; branch target cache structure means having a plurality of entries, each entry for storing branch instruction information, said branch instruction information comprising an address identifier for a branch instruction executed by said processing means and at least target address information associated with that branch instruction; said prefetch means for using an address of a currently prefetched instruction to initiate a lookup operation within said branch target cache structure means in order to determine if a hit condition is present, said hit condition being present if the address identifier stored in one of said plurality of entries matches with the address of the currently prefetched instruction, and in the presence of said hit condition the prefetch means for receiving said at least target address information from the entry giving rise to the hit condition; said branch target cache structure means comprising an initial entry branch target cache means having a first number of entries, and a promoted entry branch target cache means having a second number of entries, said first number of entries and said second number of entries collectively forming said plurality of entries of the branch target cache structure means; the branch target cache structure means being configured such that said initial entry branch target cache means and said promoted entry branch target cache means are accessed in parallel during said lookup operation; the data processing apparatus further comprising allocation means, responsive to a branch instruction executed by the processing means that does not currently have a corresponding entry in the branch target cache structure means, for performing an initial allocation operation to allocate one of the entries in the initial entry branch target cache means for storing the branch instruction information for that branch instruction; and the allocation means, further responsive to detection of a promotion threshold condition in relation to one of the entries in said initial entry branch target cache means, for performing a promotion allocation operation to migrate the branch instruction information from that entry of the initial entry branch target cache means to an allocated entry of the promoted entry branch target cache means.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
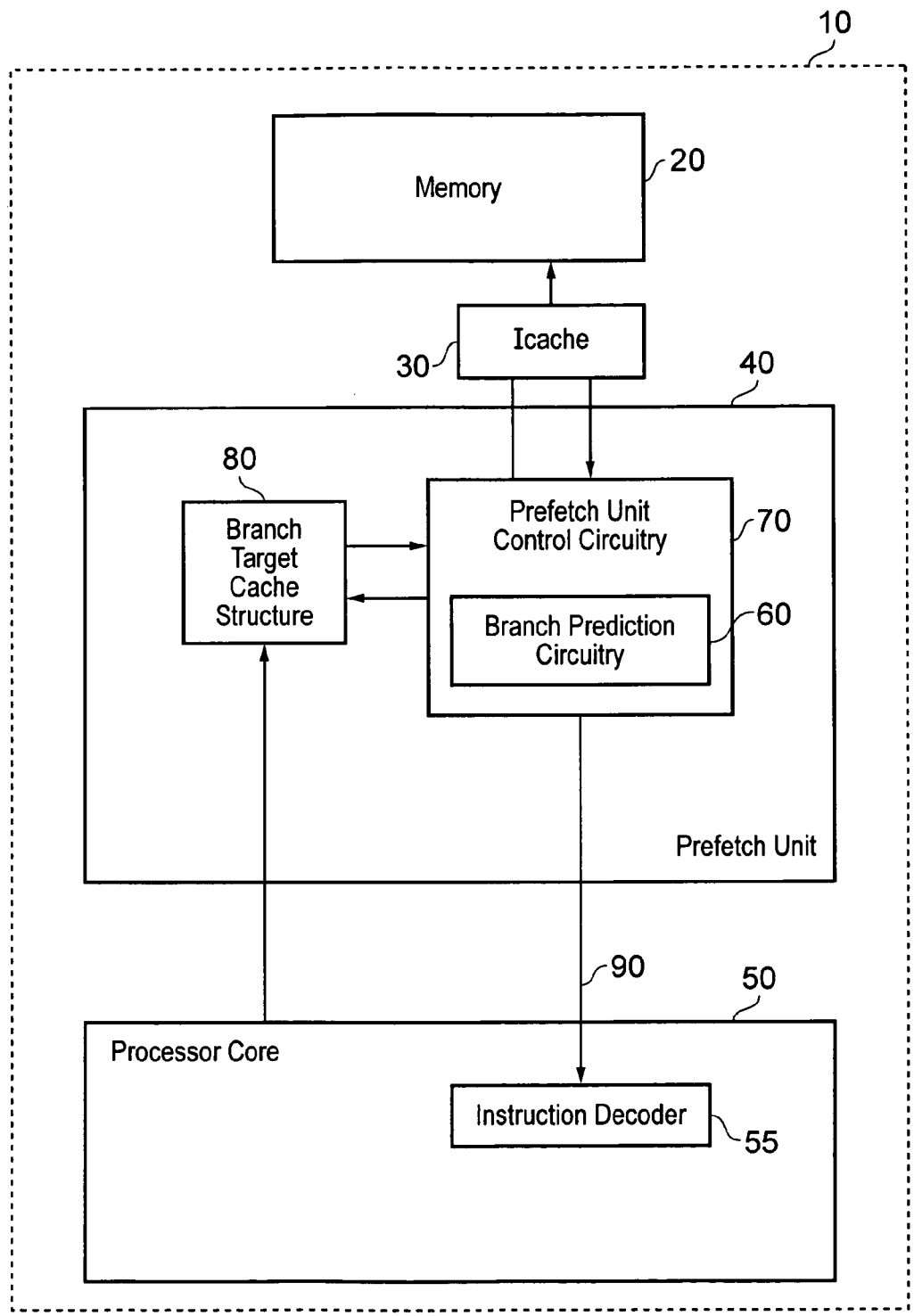
FIG. 1 is a block diagram of a data processing apparatus in accordance with one embodiment.

FIG. 1 shows a data processing apparatus 10 according to one embodiment. The data processing apparatus 10 has access to memory 20. Although in this embodiment memory 20 is shown as being within data processing apparatus 10, it will be understood that this memory 20 could be located outside of the data processing apparatus 10. The apparatus also comprises an instruction cache, I-cache 30, for storing instructions, and a prefetch unit 40. Prefetch unit 40 is configured to fetch instructions from the instruction cache 30 or, if they are not present in the instruction cache, from memory 20 or any intervening cache levels (for simplicity these are not shown in FIG. 1) between the I-cache 30 and memory 20, and to route these instructions to processor core 50 and in particular to instruction decoder 55 within processor core 50.

Within the prefetch unit 40, dynamic branch prediction circuitry 60 is provided to assist the prefetch unit in deciding what subsequent instructions to retrieve for the processor core 50. This dynamic branch prediction circuitry 60 is provided as part of the prefetch unit control circuitry 70. Dynamic predictions use historical information about what happened one or more times that a particular branch instruction was encountered to predict what will happen this time.

Also provided within the prefetch unit 40 is a branch target cache structure 80 which is arranged to store branch instruction information for a number of previously encountered branch instructions. In particular, the branch target cache structure provides a plurality of entries, and each entry is configured to store as the branch instruction information an address identifier for a branch instruction executed by the processor core 50, and target address information associated with that branch instruction.

For a currently prefetched instruction, the prefetch unit control circuitry 70 will access the branch target cache structure 80 to perform a lookup operation in order to determine if a hit condition is present, i.e. whether the address of the currently prefetched instruction matches the address identifier in any of the entries of the branch target cache structure 80. If so, the corresponding target address information will be returned from the branch target cache structure 80.

The branch prediction circuitry 60 will determine whether the currently prefetched instruction is a branch instruction, and if it is a branch instruction will predict whether the branch instruction is to be predicted as taken or not taken. As mentioned earlier, historical information can be retained for access by the branch prediction circuitry when determining whether to predict any particular branch instruction as taken or not taken.

Branch instructions may be direct branch instructions, where an immediate value is directly encoded within the instruction, and the target address can be calculated from that immediate value. For example, the immediate value may specify an offset which can be added to the program counter value in order to identify the target address. However, in addition to direct branch instructions, branch instructions may be indirect branch instructions, where no such immediate value is provided, and instead a working register within the processor core 50 is identified whose contents can be used to determine the target address. For example, it may be the contents of that register which specify the offset value. Since the contents of the register will not be available to the branch prediction circuitry 60 at the time it is performing the branch prediction operation, it is in these situations where the contents of the branch target cache structure 80 can be used. In particular, if the branch prediction circuitry 60 identifies that the currently prefetched instruction is an indirect branch instruction, and a hit has been detected in the branch target cache structure 80, the branch prediction circuitry 60 can use the resultant target address information output from the branch target cache structure 80 to determine the predicted target address for the branch instruction, and if the branch prediction circuitry predicts that the branch will be taken, it is that predicted target address that is used by the prefetch unit 40 to prefetch the next instruction from the instruction cache 30/memory 20.

As will be appreciated by those skilled in the art, many branch prediction schemes exist to predict whether a branch will be taken or not, and as the branch prediction scheme is not germane to the present invention, such branch prediction schemes will not be discussed in further detail herein.

Figure 2:
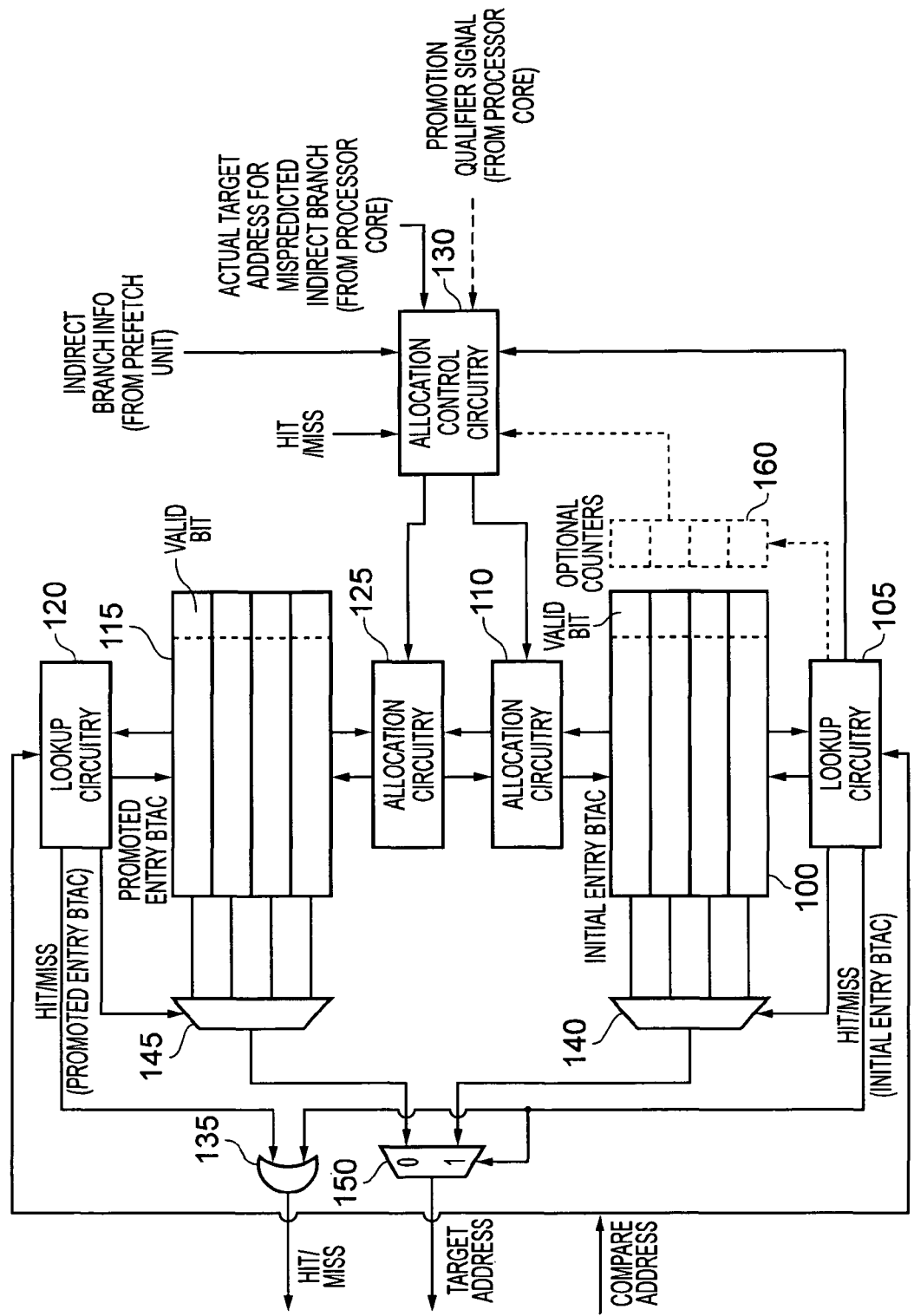
FIG. 2 is a block diagram illustrating in more detail the components provided by the branch target cache structure of FIG. 1 in accordance with one embodiment.

FIG. 2 is a block diagram illustrating in more detail components provided within the branch target cache structure 80 of FIG. 1 in accordance with one embodiment. In particular, an initial entry branch target cache 100 is provided having a first number of entries, and in addition a promoted entry branch target cache 115 is provided having a second number of entries. In the example of FIG. 2 it is assumed that both branch target caches are branch target address caches (BTACs) but as will be discussed in more detail later with reference to FIGS. 6A and & 6B, these branch target caches are not required to be BTACs.

The number of entries provided with each BTAC 100, 115 can be varied dependent on implementation, but in one embodiment both the initial entry BTAC 100 and the promoted entry BTAC 115 have the same number of entries, in this particular example 4 entries. Each entry will typically have a valid bit identifying whether the contents of that entry are valid, and for the BTAC embodiment each entry will store an address identifier for a branch instruction, and associated target address information.

The initial entry BTAC 100 is provided with associated lookup circuitry 105 for performing a lookup operation in respect of the entries of the initial entry BTAC, and allocation circuitry 110 for allocating branch instruction information into an entry of the initial entry BTAC 100. Similarly, the promoted entry BTAC 115 also includes associated lookup circuitry 120 for performing a lookup operation in respect of the entries of the promoted entry BTAC, and allocation circuitry 125 for allocating into an entry of the promoted entry BTAC 115 branch instruction information that is being migrated from the initial entry BTAC 100. As will be discussed in more detail later, the operation of the allocation circuitry 110 and the allocation circuitry 125 is controlled by the allocation control circuitry 130.

The prefetch unit 40 is arranged, using an address of a currently prefetched instruction, to initiate a lookup operation within the branch target cache structure 80 by issuing that address as a compare address to both the lookup circuitry 105 and the lookup circuitry 120. The lookup circuitry 105 then initiates a lookup operation within the initial entry BTAC 100, whilst in parallel the lookup circuitry 120 initiates a lookup operation within the promoted entry BTAC 115. If either BTAC 100 or BTAC 115 detects a match between an address identifier stored in one of its entries and the compare address, it issues a hit signal back to its associated lookup circuitry 105, 120, along with an indication of the entry that has given rise to the hit. Dependent on whether a hit is detected or not, each lookup circuitry 105, 120 will then output a hit/miss indication to the OR gate 135, so that a combined hit/miss signal is output from the branch target cache structure 80 identifying whether a hit has been detected within the branch target cache structure. In addition, based on the information returned from the relevant BTAC to the lookup circuitry, each lookup circuitry 105, 120 issues a control signal to its associated multiplexer 140, 145 to select the target address information from one of the associated BTAC entries to output to the multiplexer 150. In the event of a hit being detected, the lookup circuitry will ensure that the target address from the entry giving rise to the hit is output from the associated multiplexer 140, 145. In the absence of a hit, it does not matter which entry is selected by the multiplexer, since that information will not be used by the branch prediction circuitry 60.

As shown in FIG. 2, one of the hit/miss signals from the lookup circuit 105, 120 is used to control the multiplexer 150, in this example the hit/miss signal from the lookup circuitry 105 being used. Accordingly, if a hit is detected within the initial entry BTAC 100, the multiplexer 150 will select the output from the multiplexer 140 to output as the target address information. Alternatively, if a miss is detected in the initial entry BTAC 100, the multiplexer 150 will select the output from the multiplexer 145 to output as the target address information. Clearly if a hit has been detected within the promoted entry BTAC 115, this will be the correct target address information to output. Further, if there has also been a miss in the promoted entry BTAC 115, it does not matter that the output from the multiplexer 145 is output as the target address information, since it will not in any case be used by the branch prediction circuitry 60.

The allocation control circuitry 130 receives the hit/miss signal output from the OR gate 135. It also receives a signal from the prefetch unit identifying whether the current compare address relates to an indirect branch instruction. In the event that a miss occurs within the branch target cache structure 80, and the compare address relates to an indirect branch instruction, the allocation control circuitry 130 will determine that an initial allocation operation needs to be performed in order to allocate one of the entries in the initial entry BTAC 100 for storing the branch instruction information that will subsequently be obtained for that indirect branch instruction. In particular, once that indirect branch instruction is actually executed by the processor core, and assuming the branch is taken, the actual target address will be calculated by the processor core, and an indication of that actual target address for the mispredicted indirect branch will be returned to the allocation control circuitry 130 within the prefetch unit 40. Accordingly, at that point, the allocated entry within the initial entry BTAC can be updated to store both an address indication for the branch instruction and the determined target address for that branch instruction.

Accordingly, the allocation control circuitry 130 will notify the allocation circuitry 110 of the need to perform an initial allocation process, and the allocation circuitry will apply a predetermined replacement scheme in order to identify one of the entries in the initial entry BTAC 100 to be a victim entry in which the branch instruction information for the new branch instruction is to be stored. The replacement mechanism can take a variety of forms, but in one embodiment takes the form of a simple round-robin or a pseudorandom replacement mechanism. In one embodiment, the allocation circuitry 110 can be used to allocate one of the entries in the initial entry BTAC 100 as soon as the allocation control circuitry 130 knows that a miss has occurred for an indirect branch instruction, but before the actual target address information is available from the processor core. In that instance, the identified entry can be invalidated at that time, and once the actual target address is subsequently available, the new data can be written into that entry and the valid bit then set. Alternatively, performance of the initial allocation operation can be deferred until the actual target address information is returned from the processor core, so that the contents in the BTAC that are to be overwritten as a result of the allocation operation remain valid until the new data is actually available to be written into the BTAC.

As mentioned earlier, the allocation circuitry is also configured to perform a promotion allocation operation under certain conditions in order to migrate the branch instruction information from an entry in the initial entry BTAC 100 to an allocated entry in the promoted entry BTAC 115. In particular, the allocation control circuitry 130 is arranged to detect the presence of a promotion threshold condition in relation to an entry of the initial entry BTAC 100 and, once such a promotion threshold condition has been detected, to then initiate the promotion allocation operation.

In one embodiment, the promotion threshold condition is determined to have occurred as soon as a hit condition has been detected in respect of an entry of the initial entry BTAC 100. Accordingly, when the lookup circuitry 105 detects that hit condition, it notifies the allocation control circuitry 130, which then determines that the promotion threshold condition has been met.

In an alternative embodiment, rather than setting the promotion threshold condition such that a single hit is sufficient to cause the contents of an entry in the initial entry BTAC 100 to be promoted up to the promoted entry BTAC 115, the promotion threshold condition can be set such that multiple hits have to occur in respect of an entry before it is promoted. One way to achieve such a scheme is to provide counter circuitry 160 that contains a count value for each entry in the initial entry BTAC 100. When an entry is initially populated following an allocation operation performed by the allocation circuitry 110, the associated count value will be reset. Each time a hit condition is then detected in respect of the contents of that entry, the lookup circuitry 105 is arranged to issue a control signal to the counter circuitry 160 in order to cause the corresponding count value to be incremented. The allocation control circuitry 130 then monitors the values of the counters held by the counter circuitry 160, and if a count value reaches a predetermined threshold, the allocation control circuitry 130 then determines that the promotion threshold condition has been met in relation to the corresponding entry in the initial entry BTAC 100, and accordingly initiates a promotion allocation operation.

In one embodiment, the promotion allocation operation can be performed as soon as the allocation control circuitry 130 has determined that the promotion threshold condition has been met. However, in an alternative embodiment the allocation control circuitry 130 is arranged to receive a promotion qualifier signal from the processor core 50 when the branch instruction giving rise to the last occurrence of the hit condition (i.e. the occurrence that caused the counter to reach the threshold value) has been executed by the processor core, the promotion qualifier signal identifying whether the target address information obtained from the relevant entry of the initial entry BTAC 100 was in fact correct. Only if the promotion qualifier signal indicates that that target address information was correct is the promotion allocation operation then performed.

Both the allocation circuitry 110 and the allocation circuitry 125 are used when performing the promotion allocation operation. In particular, the allocation circuitry 125 receives a control signal from the allocation control circuitry 130 causing it to apply a replacement scheme in order to select an entry of the promoted entry BTAC 115 to be a victim entry used to receive the branch instruction information that is to be migrated from the entry of the initial entry BTAC 100 exhibiting the promotion threshold condition. As with the initial allocation operation performed by the allocation circuitry 110 discussed earlier, any suitable replacement scheme can be used, and in one embodiment a simple round-robin or pseudorandom replacement scheme is used to select a victim entry within the promoted entry BTAC 115.

Once the victim entry within the promoted entry BTAC 115 has been identified, the allocation circuitry 110 retrieves the branch instruction information from the relevant entry in the initial entry BTAC 100 and routes it to the allocation circuitry 125, from where it is stored in the identified victim entry within the promoted entry BTAC 115.

In one embodiment, at this point, the allocation circuitry 110 invalidates the relevant entry in the initial entry BTAC 100 since the relevant information is now stored within the promoted entry BTAC 115. However, in an alternative embodiment, the previously stored contents in the victim entry identified within the promoted entry BTAC 115 is temporarily buffered, and then returned via the allocation circuitry 125 to the allocation circuitry 110 for storing within the vacated entry of the initial entry BTAC 100. As a result, in this alternative embodiment, rather than discarding the current contents of the victim entry within the promoted entry BTAC when the branch instruction information migrated from the initial entry BTAC 100 is stored within the promoted entry BTAC, that information is instead retained, but demoted back to the initial entry BTAC 100.

Figure 3:
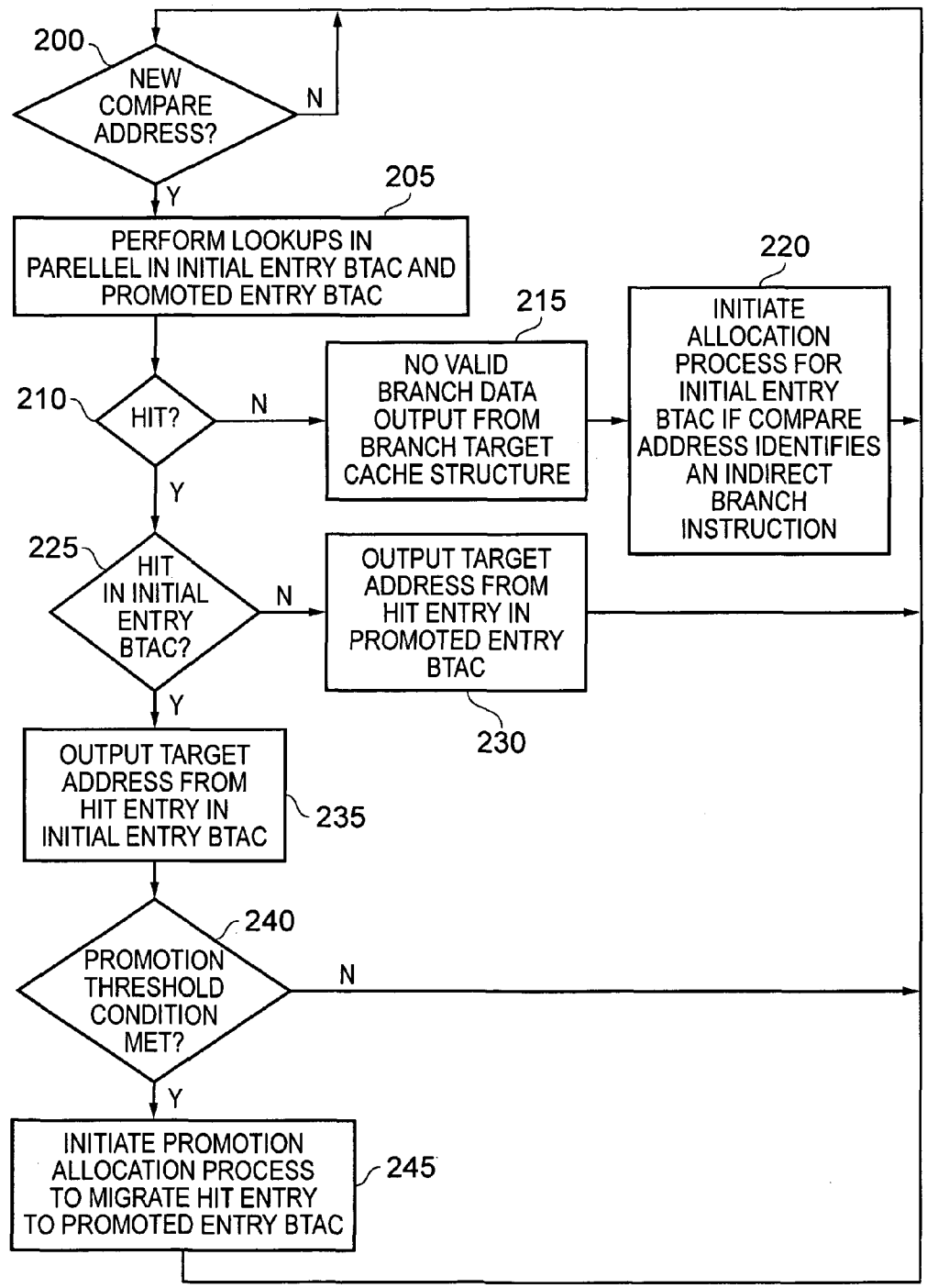
FIG. 3 is a flow diagram illustrating the process performed by the branch target cache structure of FIG. 2 in accordance with one embodiment.

FIG. 3 is a flow diagram illustrating the operation of the circuitry of FIG. 2 in accordance with one embodiment. At step 200, it is determined whether there is a new compare address provided from the prefetch unit. If not, the process stays at step 200 until there is a new compare address. Once a new compare address is identified, then at step 205 a lookup operation is performed in parallel in the initial entry BTAC 100 and the promoted entry BTAC 115. Thereafter, at step 210, it is determined whether a hit condition has been detected. If not, no valid branch target data is output from the branch target cache structure at step 215, and the process proceeds to step 220 where the allocation control circuitry 130 will initiate an initial allocation operation in respect of the initial entry BTAC 100 if the compare address giving rise to the miss does in fact identify an indirection branch instruction. The process performed at step 220 will be discussed in more detail later with reference to FIG. 4.

If a hit is detected at step 210, it is determined at step 225 whether the hit has occurred in respect of the initial entry BTAC 100. If not, the target address is output at step 230 from the hit entry in the promoted entry BTAC 115, whereafter the process returns to step 200.

However, if instead it is determined at step 225 that the hit did occur in the initial entry BTAC, then the target address is output from the hit entry in the initial entry BTAC at step 235, whereafter at step 240 it is determined whether the promotion threshold condition has been met. If not, the process returns to step 200.

However, if at step 240 the allocation control circuitry 130 determines that the promotion threshold condition has been met, then at step 245 it initiates the promotion allocation operation in order to migrate the contents of the hit entry from the initial entry BTAC 100 to an allocated entry in the promoted entry BTAC 115. As discussed earlier with reference to FIG. 2, the actual performance of the promotion allocation operation at step 245 can be made contingent on receipt of a promotion qualifier signal from the processor core indicating that the target address of the hit entry is in fact correct. Following step 245, the process returns to step 200.

Figure 4:
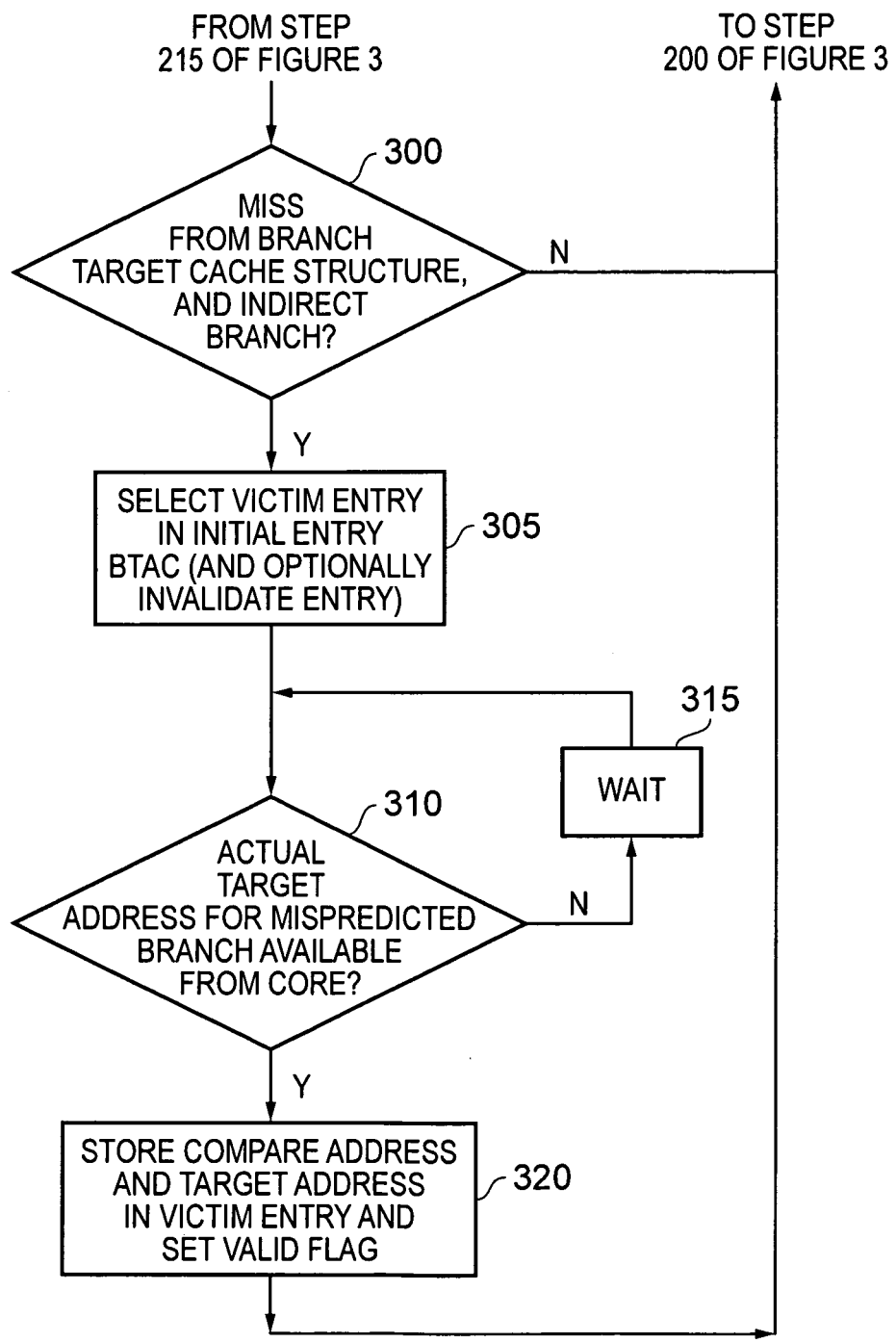
FIG. 4 illustrates the process performed by the allocation circuitry of FIG. 2 in one embodiment, when a miss is detected in the branch target cache structure, and the compare address is determined to relate to an indirect branch instruction.

FIG. 4 illustrates the steps performed at step 220 of FIG. 3 in accordance with one embodiment. At step 300, the allocation control circuitry 130 determines whether there is a miss from the branch target cache structure, in respect of a compare address which is associated with an indirect branch instruction. If that condition is not met, then no action is performed, and the process merely proceeds back to step 200 of FIG. 3. However, if that condition is met, then the allocation control circuitry 130 causes the allocation circuitry 110 to select a victim entry in the initial entry BTAC 100 at step 305. As discussed earlier with reference to FIG. 2, that victim entry may optionally be invalidated at that time, or alternatively its contents can remain valid until such time as the actual target address for the mispredicted indirect branch has been returned from the processor core.

At step 310, it is determined whether the actual target address for the mispredicted branch instruction is now available from the processor core, and if not the process waits for some predetermined time at step 315, before re-performing the check of step 310. Once it is determined at step 310 that the actual target address is available, then the compare address and target address are stored in the victim entry of the initial entry BTAC 100 at step 320, and the valid flag is set. Thereafter, the process returns to step 200 of FIG. 3.

Figure 5A:
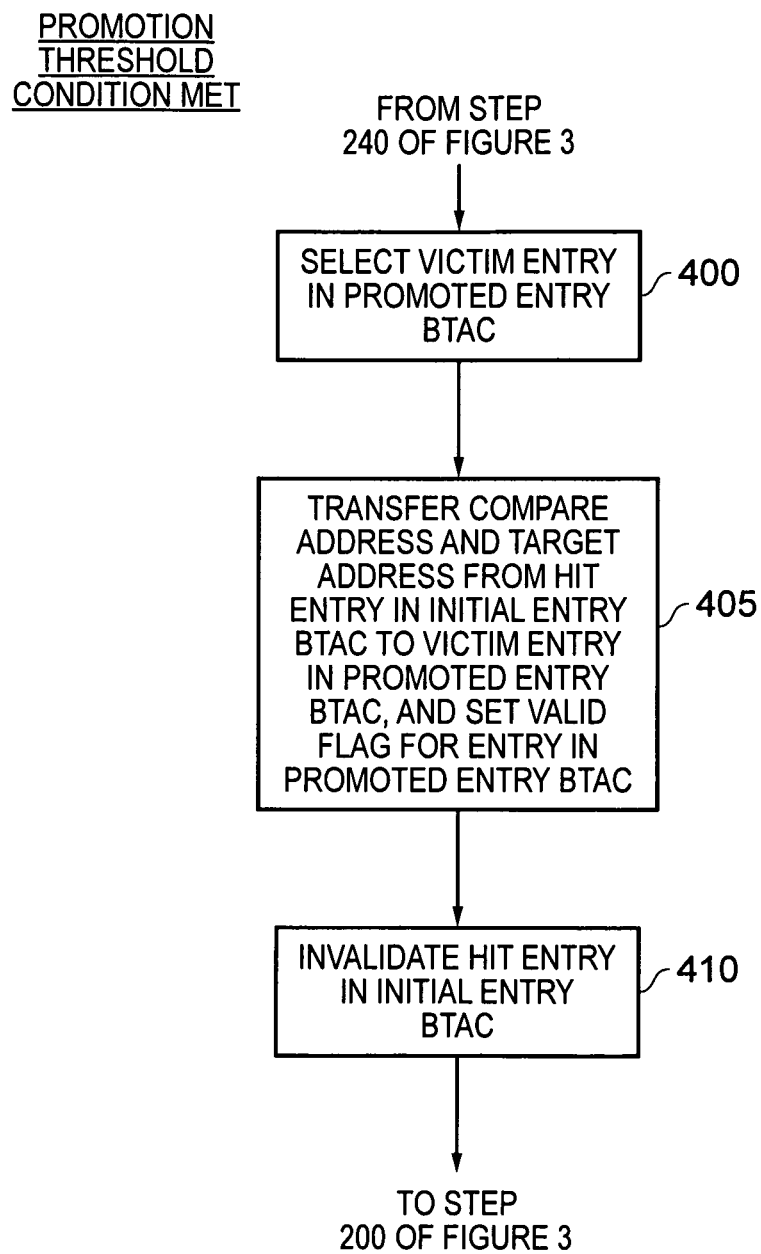
FIG. 5A illustrates the promotion allocation operation performed by the allocation circuitry in accordance with one embodiment when the promotion threshold condition is met.

FIG. 5A is a flow diagram illustrating the steps performed to implement step 245 of FIG. 3 in accordance with one embodiment. At step 400, the allocation circuitry 125 selects a victim entry in the promoted entry BTAC 115. Thereafter, at step 405, the compare address and target address from the hit entry in the initial entry BTAC 100 is transferred to the victim entry in the promoted entry BTAC and the valid flag is set for that entry in the promoted entry BTAC. Thereafter, at step 410, the relevant entry in the initial entry BTAC is invalidated.

Figure 5B:
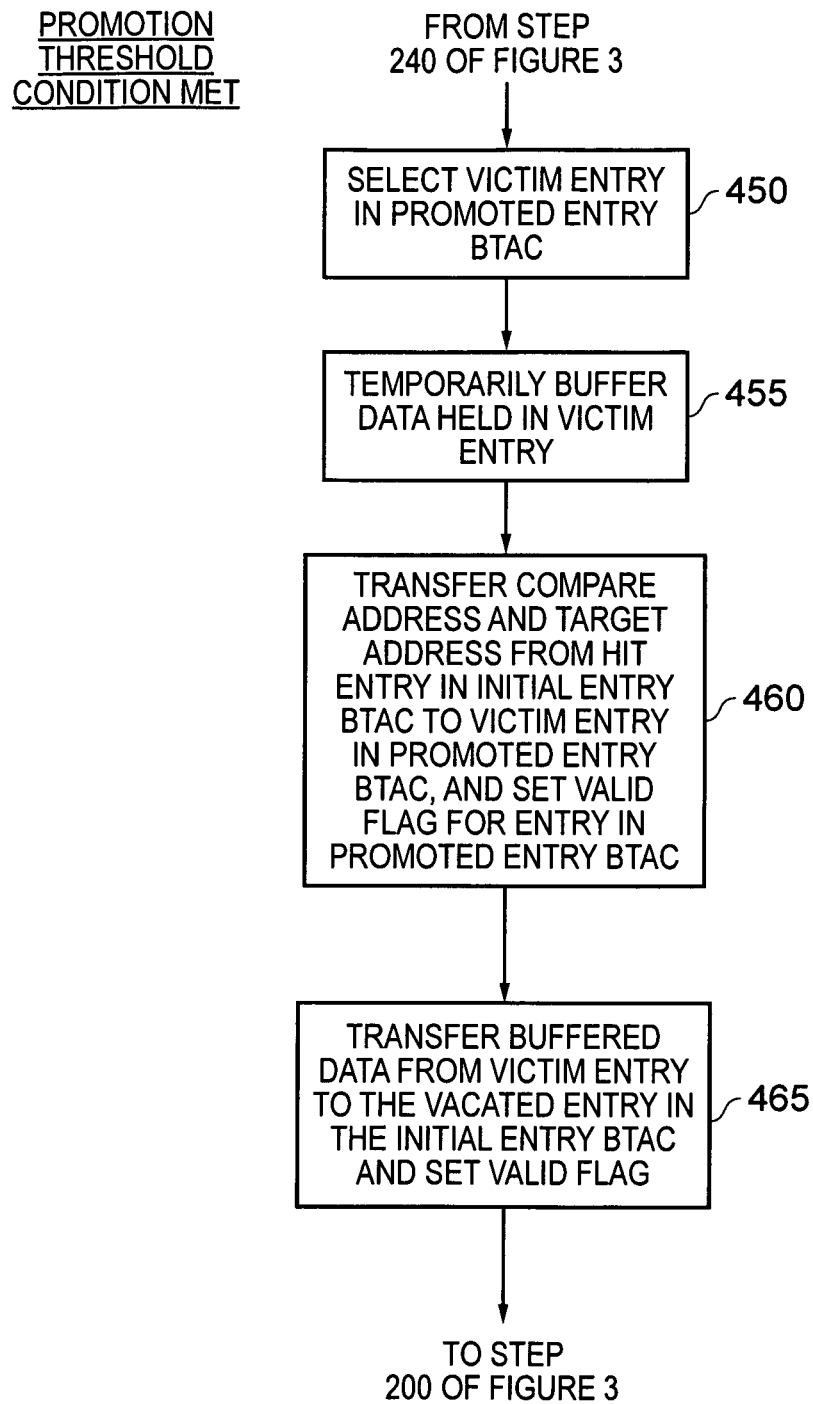
FIG. 5B illustrates the promotion allocation operation performed by the allocation circuitry in accordance with an alternative embodiment when the promotion threshold condition is met.

FIG. 5B illustrates an alternative embodiment for implementing step 245 of FIG. 3. Step 450 of FIG. 5B corresponds to step 400 of FIG. 5A. However, prior to transferring the branch instruction information from the initial entry BTAC to the victim entry of promoted entry BTAC, the data currently held in the victim entry of the promoted entry BTAC is temporarily buffered at step 455. The process then proceeds to step 460, where the branch instruction information is migrated from the initial entry BTAC to the promoted entry BTAC, step 460 corresponding to step 405 of FIG. 5A. Thereafter, at step 465, the data buffered at step 455 is then transferred to the vacated entry in the initial entry BTAC, and the valid flag is set for that entry.

Figure 6A:
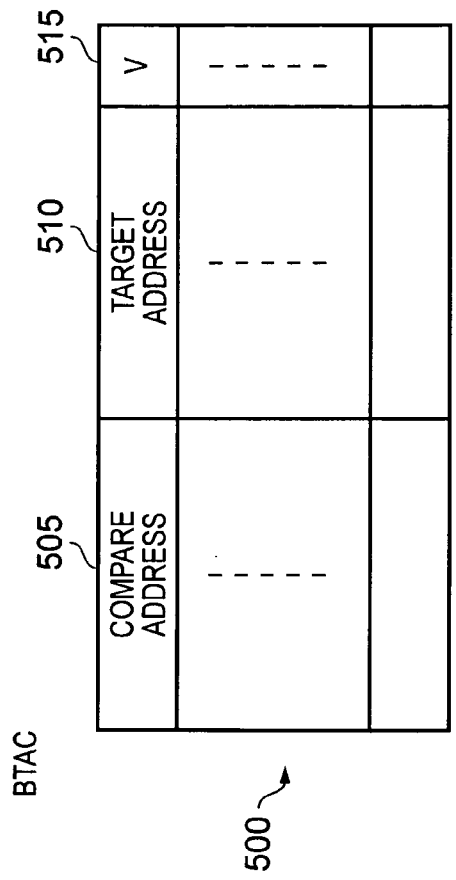
FIGS. 6A and 6B schematically illustrate the information provided within each entry of the branch target cache structure, in accordance with two alternative embodiments.
Figure 6B:
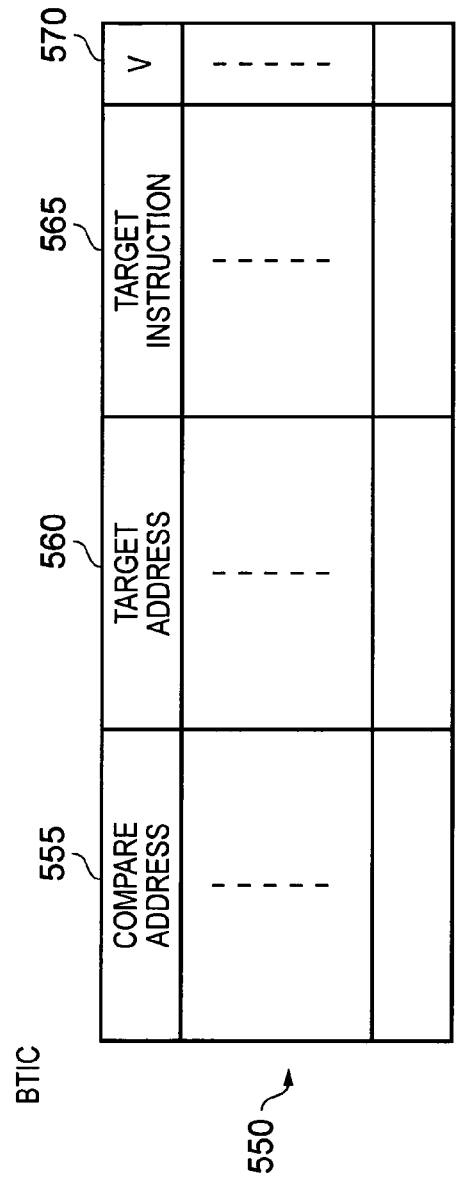

FIG. 6A illustrates the structure of BTAC 500, which can be used to implement either of the BTACs 100, 115 of FIG. 2. As shown, each entry includes a compare address field 505, a target address field 510, and a valid flag 515, the valid flag typically being a single bit. However, whilst the above described embodiments have been described in relation to a BTAC structure, they are also equally applicable to other forms of branch target cache, for example, a branch target instruction cache (BTIC). As shown in FIG. 6B, a BTIC 550 has additional information stored in each entry. In particular, in addition to a compare address field 555 and a target address field 560, one or more target instructions can be stored within the field 565. As with the BTAC structure 500, each entry in the BTIC may include a valid flag 570. The one or more instructions identified in the field 565 can be provided directly from the prefetch unit back to the processor core without the need to fetch any further information from the instruction cache and/or memory. The target address information in the field 560 then identifies a next instruction needing to be prefetched by the prefetch unit to follow the one or more instructions provided in the target instruction field 565.

From the above description of embodiments, it will be appreciated that such embodiments allow a relatively small branch target cache structure to be provided that can meet the low area and power consumption requirements of modern area and power efficient processors. It also allows branch instruction information that has proven to be more valuable to be retained, without complicating the allocation process required to allocate new entries into the branch target cache structure. In particular, any such new entries are allocated into the initial entry BTAC 100, and any suitable allocation mechanism can be used, for example an allocation mechanism based on round-robin or pseudorandom replacement schemes can be used. Furthermore, because the initial entry BTAC 100 and promoted entry BTAC 115 are accessed in parallel during lookup operations, the speed of performing the lookup operation is not compromised.

Although particular embodiments have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus, comprising:
a processor configured to execute instructions including branch instructions;
a prefetch unit configured to prefetch instructions from memory prior to sending those instructions to the processor for execution;
a branch target cache structure having a plurality of entries, each entry configured to store branch instruction information, said branch instruction information comprising an address identifier for a branch instruction executed by said processor and at least target address information associated with that branch instruction;
said prefetch unit being configured, using an address of a currently prefetched instruction, to initiate a lookup operation within said branch target cache structure in order to determine if a hit condition is present, said hit condition being present if the address identifier stored in one of said plurality of entries matches with the address of the currently prefetched instruction, and in the presence of said hit condition the prefetch unit being configured to receive said at least target address information from the entry giving rise to the hit condition;
said branch target cache structure comprising an initial entry branch target cache having a first number of entries, and a promoted entry branch target cache having a second number of entries, said first number of entries and said second number of entries collectively forming said plurality of entries of the branch target cache structure;
the branch target cache structure being configured such that said initial entry branch target cache and said promoted entry branch target cache are accessed in parallel during said lookup operation;
the data processing apparatus further comprising allocation circuitry configured, for a branch instruction executed by the processor that does not currently have a corresponding entry in the branch target cache structure, to perform an initial allocation operation to allocate one of the entries in the initial entry branch target cache for storing the branch instruction information for that branch instruction; and
the allocation circuitry further being responsive to detection of a promotion threshold condition in relation to one of the entries in said initial entry branch target cache, to perform a promotion allocation operation to migrate the branch instruction information from that entry of the initial entry branch target cache to an allocated entry of the promoted entry branch target cache.

2. A data processing apparatus as claimed in claim 1, wherein the initial entry branch target cache and the promoted entry branch target cache are configured such that results of the lookup operation are available from both the initial entry branch target cache and the promoted entry branch target cache during the same clock cycle.

3. A data processing apparatus as claimed in claim 2, wherein each entry in the initial entry branch target cache has the same structure as each entry in the promoted entry branch target cache.

4. A data processing apparatus as claimed in claim 2, wherein the initial entry branch target cache has the same number of entries as the promoted entry branch target cache.

5. A data processing apparatus as claimed in claim 1, wherein the allocation circuitry is configured during the promotion allocation operation to invalidate the entry in the initial entry branch target cache whose branch instruction information has been migrated to the promoted entry branch target cache.

6. A data processing apparatus as claimed in claim 1, wherein the allocation circuitry is configured during the promotion allocation operation to additionally migrate the branch instruction information previously stored in the allocated entry of the promoted entry branch target cache to the entry in the initial entry branch target cache whose branch instruction information has been migrated to the promoted entry branch target cache.

7. A data processing apparatus as claimed in claim 1, further comprising first lookup circuitry provided in association with the initial entry branch target cache and second lookup circuitry provided in association with the promoted entry branch target cache, the first lookup circuitry and the second lookup circuitry being configured to operate in parallel during said lookup operation.

8. A data processing apparatus as claimed in claim 1, wherein the allocation circuitry comprises:

first allocation circuitry provided in association with the initial entry branch target cache;

second allocation circuitry provided in association with the promoted entry branch target cache; and allocation control circuitry for controlling the operation of the first and second allocation circuitry to perform said initial allocation operation and said promotion allocation operation.

9. A data processing apparatus as claimed in claim 1, wherein the allocation circuitry is configured to detect the promotion threshold condition in relation to one of the entries in said initial entry branch target cache if the hit condition is detected for that entry.

10. A data processing apparatus as claimed in claim 1, further comprising:

counter circuitry configured to store a count value associated with each entry of the initial entry branch target cache, the count value being arranged to be incremented each time the hit condition is detected for the associated entry;

the allocation circuitry being configured to monitor the counter circuitry and to detect the promotion threshold condition in relation to one of the entries in said initial entry branch target cache if the associated count value reaches a threshold value.

11. A data processing apparatus as claimed in claim 1, further comprising:

branch prediction circuitry configured to receive results of the lookup operation performed in the branch target cache structure, and in the event that the currently prefetched instruction specifies an indirect branch and said hit condition was detected, to predict if the branch will be taken or not taken when that currently prefetched instruction is subsequently executed by the processor; and if the prediction circuitry predicts that the branch will be taken, the prediction circuitry is further configured to use said at least target address information from the branch target cache structure to determine the next instruction to be prefetched by the prefetch unit.

12. A data processing apparatus as claimed in claim 11, wherein:

the allocation circuitry is arranged to receive a promotion qualifier signal from the processor when that currently prefetched instruction is subsequently executed by the processor, the promotion qualifier signal identifying if the target address information was correct; and the allocation circuitry is configured to defer performing the promotion allocation operation until the promotion qualifier signal is received, and only to then perform the promotion allocation operation if the promotion qualifier signal identifies that the target address information was correct.

13. A data processing apparatus as claimed in claim 1, wherein both the initial entry branch target cache and the promoted entry branch target cache are formed as a branch target address cache (BTAC).

14. A data processing apparatus as claimed in claim 1, wherein both the initial entry branch target cache and the promoted entry branch target cache are formed as a branch target instruction cache (BTIC), such that each entry additionally includes at least one instruction for providing to the processor, and the target address information identifies a next instruction to be prefetched after said at least one instruction.

15. A branch target cache structure for use in a data processing apparatus that has a processor for executing instructions including branch instructions and a prefetch unit for prefetching instructions from memory prior to sending those instructions to the processor for execution, said branch target cache structure comprising:

a plurality of entries, each entry configured to store branch instruction information, said branch instruction information comprising an address identifier for a branch instruction executed by said processor and at least target address information associated with that branch instruction;

lookup circuitry, responsive to an address of a currently prefetched instruction, to initiate a lookup operation within said plurality of entries in order to determine if a hit condition is present, said hit condition being present if the address identifier stored in one of said plurality of entries matches with the address of the currently prefetched instruction, and in the presence of said hit condition the lookup circuitry being configured to output to the prefetch unit said at least target address information from the entry giving rise to the hit condition;

an initial entry branch target cache having a first number of entries, and a promoted entry branch target cache having a second number of entries, said first number of entries and said second number of entries collectively forming said plurality of entries of the branch target cache structure;

the lookup circuitry being configured such that said initial entry branch target cache and said promoted entry branch target cache are accessed in parallel during said lookup operation;

allocation circuitry configured, for a branch instruction executed by the processor that does not currently have a corresponding entry in the branch target cache structure, to perform an initial allocation operation to allocate one of the entries in the initial entry branch target cache for storing the branch instruction information for that branch instruction; and the allocation circuitry further being responsive to detection of a promotion threshold condition in relation to one of the entries in said initial entry branch target cache, to perform a promotion allocation operation to migrate the branch instruction information from that entry of the initial entry branch target cache to an allocated entry of the promoted entry branch target cache.

16. A method of providing target address information for branch instructions within a data processing apparatus having a processor for executing instructions including said branch instructions, and a prefetch unit for prefetching instructions from memory prior to sending those instructions to the processor for execution, the method comprising:

providing a branch target cache structure having a plurality of entries, each entry storing branch instruction information, said branch instruction information comprising an address identifier for a branch instruction executed by said processor and at least target address information associated with that branch instruction;

responsive to an address of a currently prefetched instruction, performing a lookup operation within said branch target cache structure in order to determine if a hit condition is present, said hit condition being present if the address identifier stored in one of said plurality of entries matches with the address of the currently prefetched instruction, and in the presence of said hit condition outputting said at least target address information from the entry giving rise to the hit condition;

providing an initial entry branch target cache having a first number of entries, and a promoted entry branch target cache having a second number of entries, said first number of entries and said second number of entries collectively forming said plurality of entries of the branch target cache structure;

configuring the branch target cache structure such that said initial entry branch target cache and said promoted entry branch target cache are accessed in parallel during said lookup operation;

for a branch instruction executed by the processor that does not currently have a corresponding entry in the branch target cache structure, performing an initial allocation operation to allocate one of the entries in the initial entry branch target cache for storing the branch instruction information for that branch instruction; and responsive to detection of a promotion threshold condition in relation to one of the entries in said initial entry branch target cache, performing a promotion allocation operation to migrate the branch instruction information from that entry of the initial entry branch target cache to an allocated entry of the promoted entry branch target cache.

17. A data processing apparatus, comprising:

processing means for executing instructions including branch instructions;

prefetch means for prefetching instructions from memory prior to sending those instructions to the processing means for execution;

branch target cache structure means having a plurality of entries, each entry for storing branch instruction information, said branch instruction information comprising an address identifier for a branch instruction executed by said processing means and at least target address information associated with that branch instruction;

said prefetch means for using an address of a currently prefetched instruction to initiate a lookup operation within said branch target cache structure means in order to determine if a hit condition is present, said hit condition being present if the address identifier stored in one of said plurality of entries matches with the address of the currently prefetched instruction, and in the presence of said hit condition the prefetch means for receiving said at least target address information from the entry giving rise to the hit condition;

said branch target cache structure means comprising an initial entry branch target cache means having a first number of entries, and a promoted entry branch target cache means having a second number of entries, said first number of entries and said second number of entries collectively forming said plurality of entries of the branch target cache structure means;

the branch target cache structure means being configured such that said initial entry branch target cache means and said promoted entry branch target cache means are accessed in parallel during said lookup operation;

the data processing apparatus further comprising allocation means, responsive to a branch instruction executed by the processing means that does not currently have a corresponding entry in the branch target cache structure means, for performing an initial allocation operation to allocate one of the entries in the initial entry branch target cache means for storing the branch instruction information for that branch instruction; and the allocation means, further responsive to detection of a promotion threshold condition in relation to one of the entries in said initial entry branch target cache means, for performing a promotion allocation operation to migrate the branch instruction information from that entry of the initial entry branch target cache means to an allocated entry of the promoted entry branch target cache means.

* * * * *